F. KNOWLSON.
LEAF SPRING SEPARATOR.
APPLICATION FILED MAY 21, 1915.
1,159,958.
Patented Nov. 9, 1915.
2 SHEETS—SHEET 1.
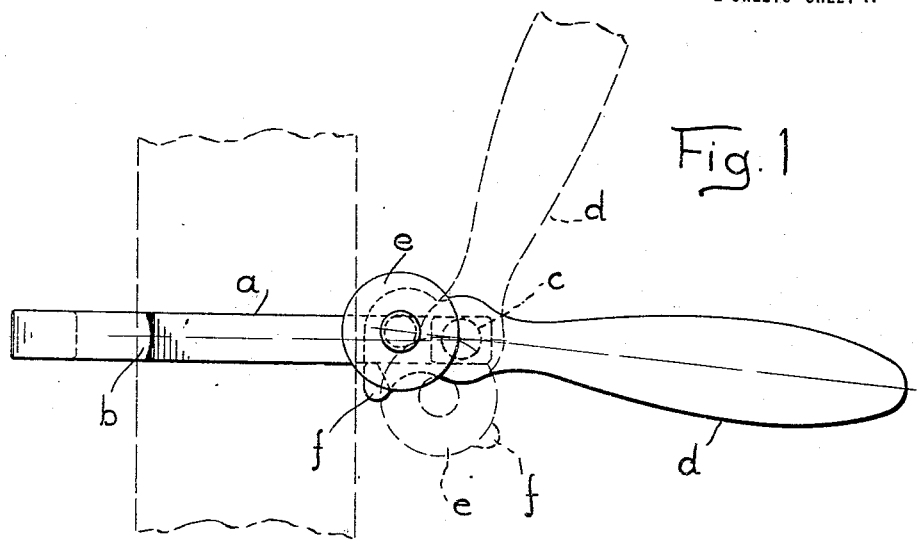
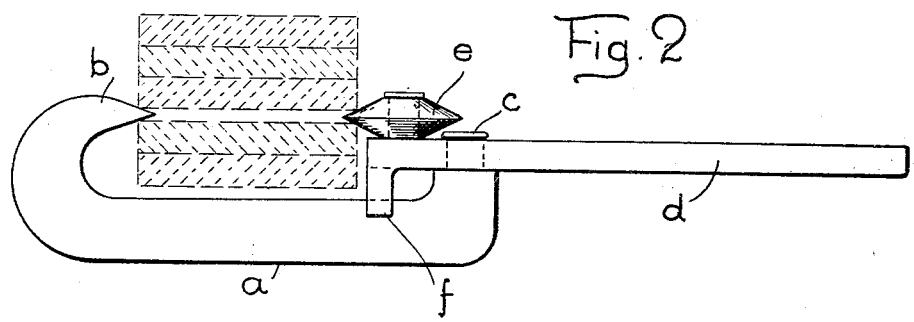
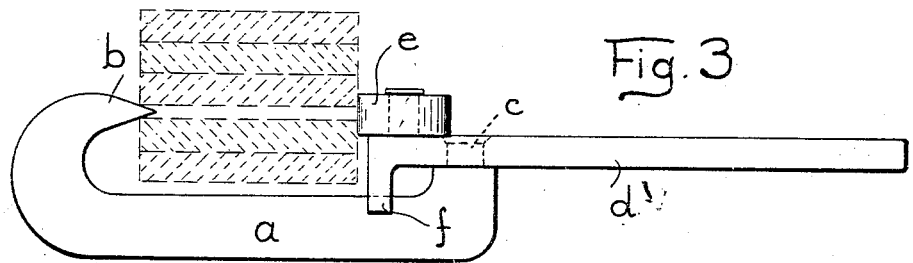
INVENTOR
Frederick Knowlson
BY
Ralzemond A. Parker
ATTORNEY

F. KNOWLSON.
LEAF SPRING SEPARATOR.
APPLICATION FILED MAY 21, 1915.

1,159,958.

Patented Nov. 9, 1915.
2 SHEETS—SHEET 2.

INVENTOR
Frederick Knowlson
BY
Ralzemond A. Parker
ATTORNEY

UNITED STATES PATENT OFFICE.

FREDERICK KNOWLSON, OF ANN ARBOR, MICHIGAN.

LEAF-SPRING SEPARATOR.

1,159,958.  Specification of Letters Patent.  Patented Nov. 9, 1915.

Application filed May 21, 1915. Serial No. 29,467.

*To all whom it may concern:*

Be it known that I, FREDERICK KNOWLSON, a subject of the King of Great Britain, residing at Ann Arbor, county of Washtenaw, State of Michigan, have invented a certain new and useful Improvement in Leaf-Spring Separators, and declare the following to be a full, clear, and exact description of the same, such as will enable others skilled in the art to which it pertains to make and use the same, reference being had to the accompanying drawings, which form a part of this specification.

This invention relates to leaf spring separators and comprises a new tool for separating the leaves of automobile springs. This tool is designed to do this work much quicker and easier than tools heretofore brought out for this purpose. It is also a type of tool which can be manufactured very cheaply, which is a big item in the success of leaf spring separators.

A new arrangement of structure to make the separator adaptable for various widths of springs is a feature hereinafter described.

Figure 4:
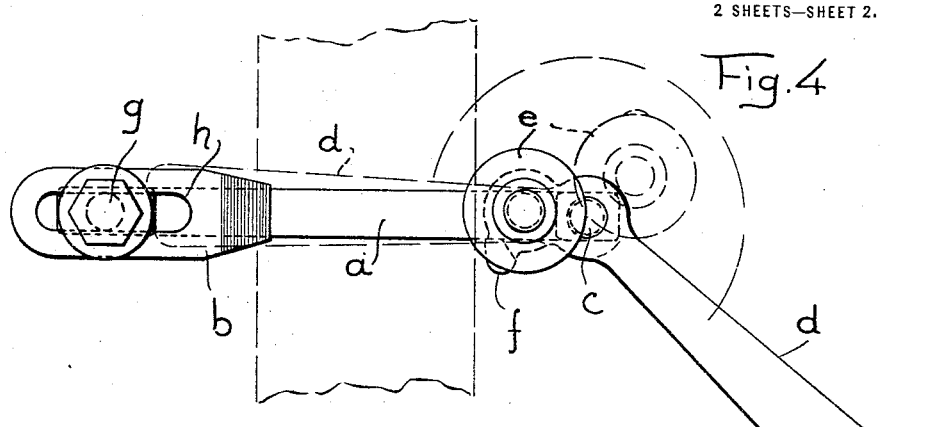
Figure 5:
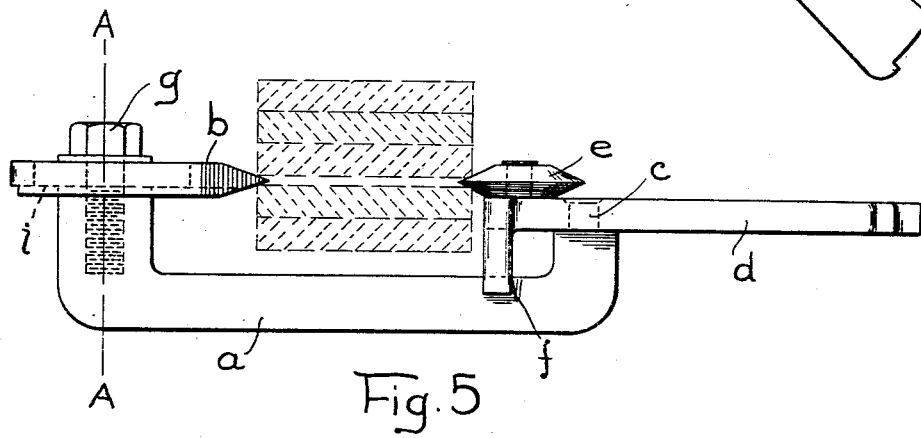
Figure 7:
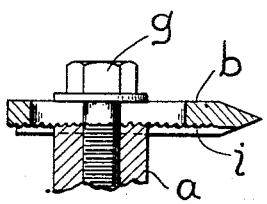
Figure 6:
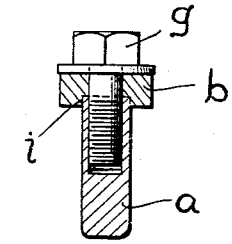

In the drawings,—Figure 1 is a plan view of the tool. Fig. 2 is a side elevation. Fig. 3 is a side elevation of a modified form. Fig. 4 is a plan view of a slightly modified form with an adjustable jaw-pin. Fig. 5 is a side elevation of the same. Fig. 6 is a sectional detail on the line A—A of Fig. 5. Fig. 7 is a sectional detail of a modified form of yoke-end and jaw-piece.

The tool comprises a yoke $a$ which carries at one end a jaw $b$ adapted to be positioned on the farther side of the spring. It is preferable to make this jaw with a wedge at its end although it will be evident that in the form of my device shown in Figs. 2 and 5, separation of the leaves could be effected without the jaw driving between the leaves at the farther side of the spring. The other side of the yoke bears a pivot pin $c$ upon which swings the lever $d$ carrying an eccentric pivoted roller $e$. I prefer to make this roller in the form of a double cone or what might be termed a double beveled periphery roller, and which I shall refer to in the claims as a roller having a wedge-like periphery. The arm of the lever terminates in a depending stop $f$ adapted to engage against the yoke. This stop is positioned on the lever so that it only engages with the yoke after the lever has passed beyond a position of alinement with the yoke and the roller and the lever has passed what might be termed the dead center. This is quite an important feature, as it will be readily realized that this arrangement prevents the lever being thrown back by the energy stored in the springs.

The employment of the roller, conical or cylindrical, is another important feature of this invention inasmuch as it acts as an antifriction device for the bearing of the lever upon the springs during its swing. In the form shown in Figs. 2 and 5 it not only acts as an anti-friction device but it actually serves to separate the springs by its wedging periphery engaging between the leaves. As already pointed out, in this form it would not be absolutely essential to have a wedge on the jaw $b$, although it would be preferable to lift the leaves at both sides. In the form shown in Fig. 3 the roller serves as an anti-friction member only and the separation of the leaves is effected by drawing the wedge on the jaw $b$ between the leaves. In the forms shown in Figs. 4 to 7 the jaw $b$ is made in the form of a separate jaw-piece, which may or may not be provided with a wedge on its end, depending upon whether a wedge-like roller is used. A screw-bolt $g$ is threaded into the upturned end of the yoke and passes through a slot $h$ in the jaw-piece. The jaw-piece is provided on its bottom with a longitudinal channel $i$ which fits over the top of the upturned end of the yoke to prevent the jaw-piece from rotating on the up-turned end. In the form shown in Fig. 7 the contacting surfaces of the channel and up-turned end are milled to prevent sliding when the bolt $g$ is tightened on the jaw-piece. It is evident that these forms provide a simple structure that may be readily adjusted to springs of various widths.

This lever and cam action leaf spring separator possesses an important advantage over the screw action separators in that it can be operated very much quicker.

What I claim is:

1. A leaf spring separator, comprising a yoke having a jaw at one end for engaging against the spring, and a lever pivoted at the other end of the yoke and carrying a roller journaled eccentrically to the lever pivot and having a wedge-like periphery, the said lever and roller being arranged to swing in a plane parallel with the leaves of a spring when the separator is attached to the spring.

2. A leaf spring separator, having in combination, a yoke provided at one end with a jaw having a wedge end adapted to be drawn between the leaves of the spring, and a lever pivoted to the other end of the jaw and provided with a roller eccentrically journaled with respect to the pivoting of the lever and adapted to secure an anti-friction bearing of the lever upon the spring.

3. A leaf spring separator, having in combination, a yoke provided with a jaw at one end, a lever pivoted at the other end of the yoke and having a cam-like action upon the spring, and a stop attached to said lever and arranged to stop the lever when it has just passed its dead center in its operation upon the spring.

4. A leaf spring separator, having in combination, a yoke provided at one end with a jaw having a wedge, a lever pivoted on the other end of the yoke, and a roller journaled on the lever eccentrically to the pivoting of the lever and provided with a wedge-like periphery.

5. A leaf spring separator comprising a yoke, an adjustable slotted jaw-piece secured to one end of the yoke, a threaded bolt passing through the slot of the jaw-piece into the yoke end for securing the jaw-piece to the yoke end, a lever pivoted to the other end of the yoke and provided with a cam-like surface for engaging the spring.

6. A leaf spring separator comprising a yoke, a screw-bolt threaded into one end of the yoke, a slotted jaw-piece adjustably securable to the said yoke by said screw-bolt passing through the slot of the jaw-piece, and a lever pivoted to the other end of the yoke and provided with a cam-like surface for engaging the spring.

7. A leaf spring separator comprising a yoke with an up-turned end, a slotted jaw-piece having a channel in its bottom for engaging the up-turned end to prevent rotation of the jaw-piece, a screw-bolt threaded into the up-turned end and passing through the slot for adjustably securing the jaw-piece at various positions on the up-turned end, and a lever pivoted to the other end of the yoke and provided with a cam surface for engaging the spring.

8. A leaf separating device for leaf springs provided with a prying member in the form of a wheel having a sharp peripheral edge, and means for bodily moving the said wheel to engage the edge thereof by rolling contact with adjacent leaves to pry the same open.

9. A leaf separating device for leaf springs provided with a support, a lever fulcrumed on the said support, and a prying wheel journaled on the said lever, the axis of the wheel being eccentric to the fulcrum of the said lever.

In testimony whereof, I sign this specification in the presence of a witness.

FREDERICK KNOWLSON.

Witness:
STUART C. BARNES.